United States Patent
Weston et al.

(10) Patent No.: US 12,233,882 B2
(45) Date of Patent: Feb. 25, 2025

(54) CONTROL SYSTEM FOR VEHICLE POWERTRAIN DURING OFF-ROAD JUMPING

(71) Applicant: FORD GLOBAL TECHNOLOGIES, LLC, Dearborn, MI (US)

(72) Inventors: Keith Weston, Canton, MI (US); Joshua Sharpe, Farmington Hills, MI (US); Brendan F. Diamond, Grosse Pointe, MI (US); James Trent, South Lyon, MI (US); David Michael Russell, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 459 days.

(21) Appl. No.: 17/739,407

(22) Filed: May 9, 2022

(65) Prior Publication Data

US 2023/0356724 A1    Nov. 9, 2023

(51) Int. Cl.
| | |
|---|---|
| B60W 40/10 | (2012.01) |
| B60W 10/02 | (2006.01) |
| B60W 10/119 | (2012.01) |
| B60W 10/18 | (2012.01) |
| B60W 30/18 | (2012.01) |
| B60W 40/09 | (2012.01) |

(52) U.S. Cl.
CPC ............ *B60W 40/10* (2013.01); *B60W 10/02* (2013.01); *B60W 10/119* (2013.01); *B60W 10/18* (2013.01); *B60W 30/18009* (2013.01); *B60W 40/09* (2013.01); *B60W 2510/104* (2013.01); *B60W 2510/22* (2013.01); *B60W 2540/10* (2013.01); *B60W 2540/12* (2013.01); *B60W 2710/021* (2013.01); *B60W 2710/18* (2013.01)

(58) Field of Classification Search
CPC ................ B60W 40/10; B60W 40/09; B60W 30/18009; B60W 30/184; B60W 10/02; B60W 10/119; B60W 10/18; B60W 10/184; B60W 2710/021; B60W 2520/30; B60W 2520/28; B60W 2510/104; B60W 2510/22; B60W 2710/18; B60W 2540/10; B60W 2540/12
USPC ............. 701/67, 69; 477/70, 71, 79, 80, 180
See application file for complete search history.

(56) References Cited

U.S. PATENT DOCUMENTS

| | | | |
|---|---|---|---|
| 4,984,161 A | 1/1991 | Nakazawa et al. | |
| 9,555,758 B2 * | 1/2017 | Le Merrer | B60R 21/013 |
| 10,336,317 B2 * | 7/2019 | Fahland | B62D 35/00 |
| 11,841,079 B2 * | 12/2023 | Ebner | F16H 59/50 |
| 2009/0062994 A1 | 3/2009 | Nedachi et al. | |

(Continued)

OTHER PUBLICATIONS

WO2020/213333A1 with english translation; Oct. 31, 2024 (Year: 2024).*

*Primary Examiner* — Roger L Pang
(74) *Attorney, Agent, or Firm* — Vincent Mastrogiacomo; Brooks Kushman P.C.

(57) ABSTRACT

A vehicle includes at least one drive wheel, a powerplant, a clutch, and a controller. The powerplant is configured to generate and deliver power to the at least one drive wheel. The clutch is disposed between the at least one drive wheel and the powerplant. The controller is programmed to, in response to detecting the at least one drive wheel disengaging the ground during a vehicle jump, open the clutch to disconnect the at least one drive wheel from the powerplant.

20 Claims, 2 Drawing Sheets

(56) References Cited

U.S. PATENT DOCUMENTS

2017/0349165 A1 12/2017 West et al.
2021/0016770 A1* 1/2021 Son ...................... F02D 41/022

* cited by examiner

CONTROL SYSTEM FOR VEHICLE POWERTRAIN DURING OFF-ROAD JUMPING

TECHNICAL FIELD

The present disclosure relates to control systems for vehicles and vehicle powertrains.

BACKGROUND

Vehicles may include power generating devices, such as an engine or an electric motor, that are configured to generate torque within a powertrain of the vehicle in order to propel the vehicle.

SUMMARY

A vehicle includes a first axle, a second axle, a powerplant, a transmission, a transfer case, and a controller. The first axle has a first set of wheels. The second axle has a second set of wheels. The powerplant is configured to generate and deliver power to the first and second axles to propel the vehicle. The transmission is configured to deliver power from the powerplant to the first axle. The transmission has a first clutch configured to connect and disconnect the front axle to and from the powerplant. The transfer case is configured to deliver power from the powerplant to the second axle. The transfer case has a second clutch configured to connect and disconnect the second axle to and from the powerplant. The controller is programmed to, in response to detecting one or more of the first set of wheels disengaging the ground during a vehicle jump, open the first clutch to disconnect the first axle from the powerplant. The controller is further programmed to, in response to detecting one or more of the second set of wheels disengaging the ground during the vehicle jump, open the second clutch to disconnect the second axle from the powerplant. The controller is further programmed to, in response to detecting the one or more of the first set of wheels reengaging the ground during a vehicle landing after the vehicle jump, close the first clutch to reconnect the first axle to the powerplant. The controller is further programmed to, in response to detecting the one or more of the second set of wheels reengaging the ground during a vehicle landing after the vehicle jump, close the second clutch to reconnect the second axle to the powerplant.

A vehicle includes at least one drive wheel, a powerplant, a clutch, and a controller. The powerplant is configured to generate and deliver power to the at least one drive wheel. The clutch is disposed between the at least one drive wheel and the powerplant. The controller is programmed to, in response to detecting the at least one drive wheel disengaging the ground during a vehicle jump, open the clutch to disconnect the at least one drive wheel from the powerplant.

A vehicle includes an axle, a powerplant, a clutch, and controller. The axle has a drive wheel. The powerplant is configured to generate and deliver power to the axle to propel the vehicle. The clutch is disposed between the axle and the powerplant. The controller is programmed to, in response to detecting the drive wheel disengaging the ground during a vehicle jump, open the clutch to disconnect the axle from the powerplant. The controller is further programmed to, adjust a speed of the drive wheel over a flight time of the vehicle during the vehicle jump such that the speed of the drive wheel corresponds to a ground speed at a time of the vehicle landing.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
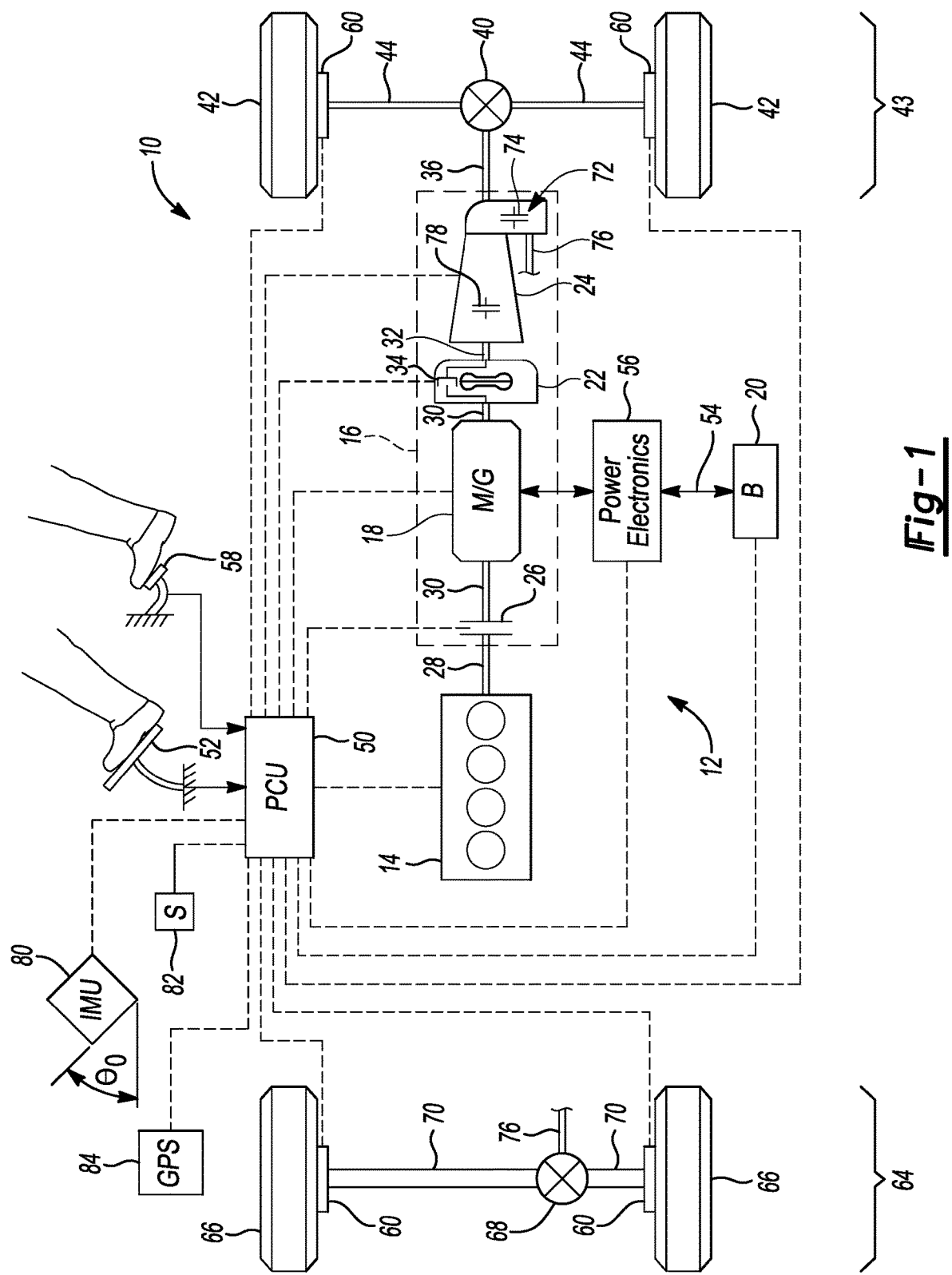
FIG. 1 is a schematic illustration of an exemplary powertrain of a hybrid/electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16. As will be described in further detail below, transmission 16 includes an electric machine such as an electric motor/generator (M/G) 18, an associated traction battery 20, a torque converter 22, and a multiple step-ratio automatic transmission, or gearbox 24.

The powertrain 12 includes power generating components (e.g., engines or electric motors) and the drivetrain. The drivetrain is the group of components that deliver power to the driving wheels, excluding the power generating components. In contrast, the powertrain 12 is considered to include both the power generating components and the drivetrain.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a first drive shaft or transmission output shaft 36 and the transmission input shaft 32. The gearbox 24 is automatically shifted from one ratio to another based on various vehicle and ambient operating conditions by an associated controller, such as a powertrain control unit (PCU). For example, the gearbox 24 may be upshifted from a lower gear to a higher gear (e.g., from $3^{rd}$ gear to $4^{th}$ gear) during acceleration or may be downshifted from a higher gear to a lower gear (e.g., from $5^{th}$ gear to $4^{th}$ gear) when the vehicle is slowing down. Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective half shaft 44 connected to the differential 40. One or more of the wheels 42 may be drive wheels that receive power from and are driven by one or more powerplants, such as the engine 14 and the M/G 18. The transmission output shaft 36 may also be referred to as an input shaft to the differential 40 and the half shafts 44 may be referred to as an output from the differential. The differential 40 may include one or more clutches to control the power output being delivered to the wheels 42 collectively or independently. Shaft 36, differential 40, half shafts 44 and a pair of the wheels 42 may form a first or rear axle 43. The powerplants (e.g., the engine 14 or the M/G 18) generate and deliver power to the rear axle 43 and the one or drive wheels 42. The differential transmits approximately equal torque to each wheel 42 while permitting slight speed differences such as when the vehicle turns a corner. Each of the wheels 42 have tires that contact the road surface to propel the HEV 10. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component amount or presence, intake air flow (MAF), transmission gear, ratio, or mode, transmission oil temperature (TOT), transmission turbine speed (TS), torque converter bypass clutch 34 status (TCC), decrease in speed or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60, which may be disposed about each wheel 42. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking where the M/G 18 is utilized to slow the HEY 10. During regenerative braking torque and rotational energy or power from spinning wheels 42 is transferred back through the gearbox 24, torque converter 22, (and/or torque converter bypass clutch 34) and is converted into electrical energy for storage in the battery 20.

The vehicle may also include a second or front axle 64 having a second pair of wheels 66. One or more of the wheels 66 may be drive wheels that receive power from and are driven by one or more powerplants, such as the engine 14 and the M/G 18. The powerplants (e.g., the engine 14 or the M/G 18) generate and deliver power to the second axle 64 and the one or drive wheels 66. The front axle 64 also includes a differential 68 that drives the wheels 66 via respective half shaft 70 connected to the differential 68. The powertrain 12 may also include a power transfer unit (PTU) 72, which also may be called a power takeoff unit or transfer case, disposed between the transmission 24 and shaft 36. The PTU 72 may include an internal clutch 74 that selectively couples a second or front driveshaft 76 to the output of the transmission 24 so that power can be transferred from the one or more powerplants to the front axle 64 and wheels 66. The front driveshaft 76 is connected to the differential 68. The differential 68 may include one or more clutches to control the power output being delivered to the wheels 66 collectively or independently. The front driveshaft 76 is shown as broken in FIG. 1 for illustrative purposes but may be construed as a single shaft.

The various components of the powertrain 12, including shaft 36, 76, transmission 24, half shafts 44, 70 wheels 42, 66, PTU 72, differentials 40, 68, etc. may be connected to each other, as described above, via constant-velocity joints. Constant-velocity joints connect two rotating parts and allow the two rotating parts to rotate about different axes.

The rear axle 43 and wheels 42 may be connected to and disconnected from the powerplants (e.g., the engine 14 or the M/G 18) by closing and opening one or more of the clutches 78 in the transmission 24. Alternatively, additional clutches may be disposed along the powertrain 12 between the powerplants and the rear axle 43 or the wheels 42 to connect and disconnect the rear axle 43 or wheels 42 to and from the powerplants. For example, clutches in the differential 40, a clutch that splits shaft 36, or clutches that split half shafts 44 may be utilized to connect and disconnect the rear axle 43 or wheels 42 to and from the powerplants.

The front axle 64 and wheels 66 may be connected to and disconnected from the powerplants (e.g., the engine 14 or the M/G 18) by closing and opening one or more of the clutches 74 in the PTU 72. Alternatively, additional clutches may be disposed along the powertrain 12 between the powerplants and the front axle 64 or the wheels 66 to connect and disconnect the front axle 64 or wheels 66 to and from the powerplants. For example, clutches in the differential 68, a clutch that splits shaft 76, or clutches that split half shafts 70 may be utilized to connect and disconnect the front axle 64 or wheels 66 to and from the powerplants.

The vehicle 10 may also include an inertial measurement unit 80. The inertial measurement unit 80 may output a signal, $a_{imu}$, representative of the inertial forces acting on the vehicle 10 in the longitudinal direction of vehicle motion (i.e., the direction from the front to the rear of the vehicle). The IMU signal, $a_{imu}$, differs from a vehicle acceleration in the longitudinal direction of vehicle motion, along, except when the vehicle is moving straight on a flat ground at zero grade and zero vehicle pitch angle. The IMU signal, $a_{imu}$, takes into account the road grade, the vehicle pitch angle, the longitudinal vehicle acceleration, $a_{long}$, and the angle of the inertial measurement unit 80 with respect to the horizontal (i.e., a plane that is perpendicular to the direction of gravity). A vehicle speed measurement, v, may also be measured via a sensor. The IMU signal, $a_{imu}$, accounts for non-horizontal and/or vertical acceleration of the vehicle in additional to horizontal acceleration of the vehicle. The IMU or additional sensors, such as accelerometers, may directly measure lateral vehicle acceleration, longitudinal vehicle acceleration, and vertical vehicle acceleration.

The IMU signal, $a_{imu}$, may be derived from equation (1):

$$a_{imu} = a_{long} \cos(\theta_p + \theta_0) g \sin(\theta_{gr} + \theta_p + \sigma_0) \approx a_{long} + g \sin \theta_{gr} + g(\theta_p + \sin \theta_0) \cos \sigma_{gr} \quad (1)$$

where $a_{imu}$, is the IMU signal, $a_{long}$ is the longitudinal vehicle acceleration of the vehicle, $\theta_p$ is the vehicle pitch angle, $\theta_0$ is the angle of the inertial measurement unit 80 with respect to the horizontal (i.e., a plane that is perpendicular to the direction of gravity), g is the acceleration due to gravity, and $\theta_{gr}$ is the road grade.

The angle of the inertial measurement unit, $\theta_0$, is generally fixed with respect to the vehicle frame, but it may vary if the vehicle is unevenly loaded or due to tire pressure conditions. The angle of the inertial measurement unit, $\theta_0$, may also vary from vehicle to vehicle due to variation in installation of the inertial measurement unit 80. The vehicle pitch angle, $\theta_p$, may change often depending on drive conditions (e.g., the vehicle pitch angle, $\theta_p$, is going to change during acceleration and braking maneuvers). The road grade, $\theta_{gr}$, may also change often as the drive environment (i.e., the slope or grade of the surface the vehicle is traveling) changes.

The vehicle 10 may also include one or more ride height sensors 82 that measure the distance from the bottom of the vehicle body to the ground. The ride height sensors 82 may be displacement sensors that measure the jounce or droop of the wheels 42, 66 by measuring a displacement of suspension of components (e.g., dampers, shocks, struts, spring, etc.) from resting positions. Upward movement of the suspension components from resting positions corresponds to jounce of the wheels 42, 66 while downward movement 42, 66 corresponds to droop of the wheels 42, 66. The jounce and droop of each wheel 42, 66 may be measured separately via a separate sensor 82, which is communicated to the controller 50.

It should be understood that the vehicle configuration described herein is merely exemplary and is not intended to be limited. Other non-hybrid, electric, or hybrid vehicle configurations should be construed as disclosed herein. Other vehicle configurations may include, but are not limited to, vehicles powered only by an engine, micro-hybrid vehicles (i.e., powered by an engine only that has a start/stop function), series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

During a vehicle jump, one or more axles or wheels of the vehicle may leave the ground. This may lead to a discrepancy between the inertia of the powertrain/drivetrain and the vehicle inertia, particularly if the operator depresses the accelerator pedal or the brake pedal while the vehicle is in the air leading to a discrepancy between the vehicle speed and wheel speed. Once the vehicle lands, the difference between the inertias of the powertrain/drivetrain and the vehicle may create and undesirable excessive load on the drivetrain/powertrain.

Figure 2:
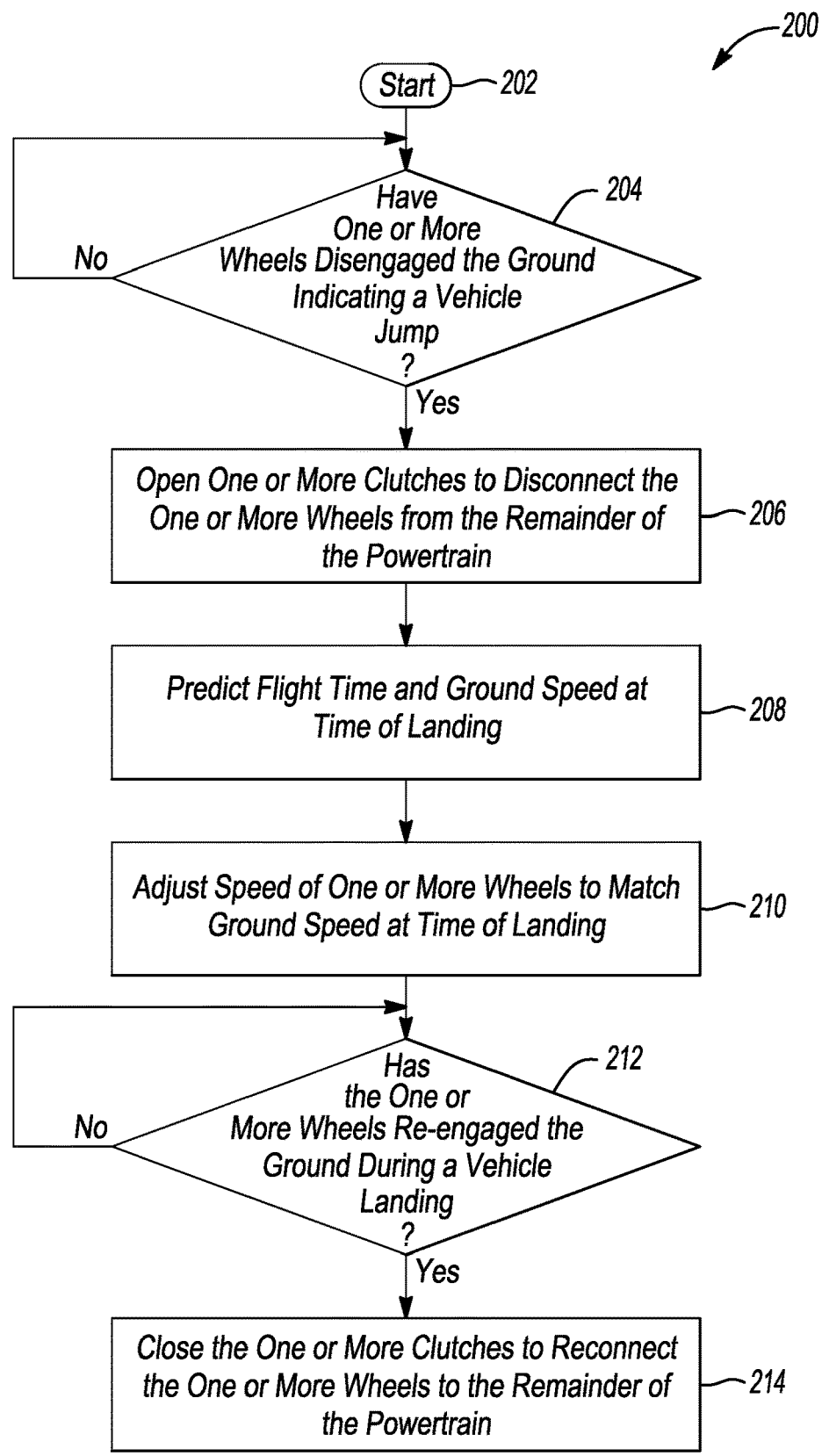
FIG. 2 is a flowchart illustrating a method of controlling the vehicle powertrain during off-road jumping.

Referring to FIG. 2, a flowchart illustrating a method 200 of controlling the vehicle powertrain 12 during off-road jumping is illustrated. The method 200 may be implemented by the controller 50. The method 200 may require activation and deactivation by a user input into the controller via a control panel or human machine interface. The method 200 may be stored as control logic and/or algorithms within the controller 50. The controller 50 may be configured to control the operation of various components of the powertrain 12 and/or vehicle 10 in response to various conditions of the powertrain 12 and/or vehicle 10. The method 200 begins at start block 202. The method 200 may be initiated at start block 202 once an ignition of the vehicle 10 has been turned to an "on" position or may be initiated upon a user selecting an off-road jumping mode of operation.

The method 200 next moves on to block 204 where it is determined if one or more wheels 42, 66 has disengaged the ground during a vehicle jump. If one or more wheels 42, 66 has not disengaged the ground the method 200 recycles back to the beginning of block 204. If the one or more wheels 42, 66 has disengaged the ground, the method 200 moves on to block 206 where one or more clutches are opened to disconnect the one or more wheels 42, 66 from the remainder of the powertrain 12 and from the powerplants (e.g., engine 14 and M/G 18). More specifically, (i) one of the clutches 78 in the transmission 24, clutches in the differential 40, a clutch that splits shaft 36, or clutches that split half shafts 44 are opened to disconnect the rear axle 43 or the individual wheels 42 from the remainder of the powertrain 12 and from the powerplants or (ii) one the clutches 74 in the PTU 72, clutches in the differential 68, a clutch that splits shaft 76, or clutches that split half shafts 70 may be utilized to connect and disconnect the front axle 64 or the individual wheels 66 from the remainder of the powertrain 12 and from the powerplants. However, it should be understood that any clutch that is configured to disconnect the axles 43, 64 and the wheels 42, 66 from the powerplants may be utilized at block 206.

The method 200 at blocks 204 and 206 may function to control all wheels 42, 66 collectively (e.g., the wheels 42, 66 and/or axles 43, 64 may be disconnected from the remainder of the powertrain 12 only when all the wheels 42, 66 disengage the ground), individually (e.g., each wheel 42, 66 may be disconnect from the remainder of the powertrain 12 in response to the specific wheel leaving the ground), or by axle (e.g., each wheel 42 or the rear axle 43 as a whole may be disconnect from the remainder of the powertrain 12 in response to each wheel 42 disengaging the ground and each wheel 66 or the rear axle 64 as a whole may be disconnect from the remainder of the powertrain 12 in response to each wheel 66 disengaging the ground).

Several methods may be utilized to determine if the one or more wheels 42, 66 has disengaged the ground during a vehicle jump at block 204. A first method of determining if the one or more wheels 42, 66 has disengaged the ground during a vehicle jump may include determining if a non-horizontal or vertical acceleration of the vehicle 10 has exceeded a threshold valve, which is indicative that one or more wheels 42, 66 has disengaged the ground and may be communicated to the controller via the IMU 80 or another sensor (e.g., accelerometer). A second method of determining if the one or more wheels 42, 66 has disengaged the ground during a vehicle jump may include determining if the ride height of the vehicle 10 has exceeded a threshold valve, which is indicative that one or more wheels 42, 66 has disengaged the ground and may be communicated to the controller via the one or more ride height sensors 82.

These first and second methods may be utilized in combination with each other. For example, a combined logic utilizing both the ride height sensor 82 and the IMU 80 can be used to determine which wheels are on and off the ground. Such logic may include, if the front wheels 66 are at full rebound or jounce (as determined via the ride height sensor 82), the vertical acceleration of the vehicle 10 is greater than zero (as determined via the IMU 80 or other sensor), and a pitch rate of the vehicle 10 (i.e., the rate of the change of the vehicle pitch) is near or above zero while the vehicle 10 is pitching forward, it may be determined that the front wheels 66 are on the ground and the rear wheels 43 are off of the ground. Another example of such logic may include if the rear wheels 42 are at full rebound or jounce (as determined via the ride height sensor 82), the vertical acceleration of the vehicle 10 is greater than zero (as determined via the IMU 80 or other sensor), and a pitch rate of the vehicle 10 (i.e., the rate of the change of the vehicle pitch) is near or above zero while the vehicle 10 is pitching rearward, it may be determined that the rear wheels 43 are on the ground and the front wheels 66 are off of the ground.

A third method of determining if the one or more wheels 42, 66 has disengaged the ground during a vehicle jump may include determining if a droop of the one or more wheels 42, 66 has exceeded a threshold value for a predetermined period of time, which is indicative that one or more wheels 42, 66 has disengaged the ground and may be communicated to the controller via the one or more ride height sensors 82 or other sensor that determines wheel displacement. The threshold value may be a full droop where the wheel has drooped downward to the bottom end of the range of vertical motion of the wheel.

A fourth method of determining if the one or more wheels 42, 66 has disengaged the ground during a vehicle jump may be based on a mapped relationship between a vehicle speed (determined via global positioning system or other sensor), a non-horizontal or vertical acceleration of the vehicle (as determined via the IMU 80 or other sensor), and a vehicle ride height (as determined via the ride height sensor 82). Look-up tables based on these three variables, may then be utilized to determine if the one or more wheels 42, 66 have disengaged the ground. This fourth method may be based on a supervised machine learning algorithm that learns over time what threshold combinations or values of vehicle speed, ride height at a certain wheel, and non-horizontal or vertical acceleration are indicative that one or more wheels 42, 66 have disengaged the ground. The supervision/model training may be done by looking at torque at the wheels 42, 66 and may include filters (e.g., low-pass filters) to filter out false positives that the one or more wheels 42, 66 have disengaged the ground. The machine learning algorithm may be a support-vector machine model, a linear regression model, a logistic regression model, a Naive Bayes Model, a linear discriminate analysis model, a K-nearest neighbor model, a neural network model, a similarity learning model, or any other machine learning algorithm or model know in the art.

A fifth may method of determining if the one or more wheels 42, 66 has disengaged the ground during a vehicle jump may be based on a rate of acceleration of the one or more wheels 42, 66 or a ramp rate at which acceleration increases or decreases exceeding a threshold, which is indicative that one or more wheels 42, 66 has disengaged the ground as result of resistive force on the one or more wheels 42, 66 being lower than expected (e.g., wheel inertia increasing or decreasing in greater proportion to a corresponding expected acceleration of the vehicle mass). Such an acceleration may occur when either the accelerator pedal 52 or brake pedal 58 is depressed while the one or more wheels 42, 66 have disengaged the ground. An application of the accelerator pedal 52 while the one or more wheels 42, 66 have disengaged the ground may result in a positive acceleration exceeding a threshold or a ramp rate at which the positive acceleration increases exceeding a threshold. Such a sudden increase in acceleration above an expected threshold may be referred to as wheel speed flare-up. An application of the brake pedal 58 while the one or more wheels 42, 66 have disengaged the ground may result in an absolute value of a negative acceleration exceeding a threshold or a ramp rate at which the absolute value of the negative acceleration increases exceeding a threshold.

The method 200 next moves on to block 208 where a flight time and a ground speed of the vehicle 10 at the time of a vehicle landing after the vehicle jump are predicted. The vehicle flight time may correspond to the time period between an initiation of the vehicle jump and the vehicle landing. A ground speed of the vehicle 10 may correspond to the rate or speed at which the vehicle 10 moves over a corresponding ground distance while in the air during the vehicle jump.

The ground speed of the vehicle 10 during the vehicle jump may be measured via a GPS sensor 84 (see FIG. 1) that communicates with the controller 50. The ground speed may also be estimated as the vehicle speed at the time that the vehicle jump is initiated (e.g., when the one or more of the wheels 42, 66 disengage the ground). Over the flight time, the ground speed may be further refined and estimated as the vehicle speed at the initiation of the vehicle jump minus an expected decrease in vehicle speed during the flight time, which may be due to air drag. Therefore, the ground speed at the time of the vehicle landing may be equal to the vehicle speed at the initiation of the vehicle jump minus the expected decrease in vehicle speed during the flight time, which may be due to air drag.

The flight time may be based on a mapped relationship between the vehicle speed 10 (as determined via the GPS sensor 84), the non-horizontal or vertical acceleration of the vehicle 10 (as determined via the IMU 80 or other sensor), and the vehicle ride height (as determined via the ride height sensor 82). Look-up tables based on these three variables, may then be utilized to determine an expected flight time. A supervised machine learning algorithm that learns over time what threshold combinations or values of vehicle speed, ride height at a certain wheel, and non-horizontal or vertical acceleration correspond to expected flight times. The supervision/model training may be done by looking at torque at the wheels 42, 66 and may include filters (e.g., low-pass filters) that filter out outlier values. The machine learning algorithm may be a support-vector machine model, a linear regression model, a logistic regression model, a Naive Bayes Model, a linear discriminate analysis model, a K-nearest neighbor model, a neural network model, a similarity learning model, or any other machine learning algorithm or model know in the art.

A comparison of ground speed (measured via the GPS sensor 84) to a wheel speed (e.g., a speed of one or more of the wheels 42, 66) may be used to determine a speed differential and can be included in an algorithm to determine a reconnect strategy and timing as well as to confirm which wheels are off the ground (e.g., such a speed differential may be indicative of sudden acceleration above an expected threshold or wheel speed flare-up). The controller 50 may adjust speeds of the one or more wheels 42, 66 during the flight time of the vehicle 10 and during the vehicle jump such that the speeds of the one or more wheels 42, 66 correspond to the ground speed at the time of the vehicle landing. This may be accomplished via braking the wheels 42, 66 if decreasing wheel speed is required or via closing or partially closing the clutch or clutches that were opened at block 206 to transfer power to the wheels 42, 66 if increasing wheel speed is required. If increasing wheel speed is required, the clutch or clutches may be reopened at the time of landing to prevent transferring an excessive load to the drivetrain/powertrain.

The method 200 next moves on to block 212 where it is determined if the one or more wheels 42, 66 has reengaged the ground during a vehicle landing. If the one or more wheels 42, 66 has not reengaged the ground, the method 200 recycles back to the beginning of block 212. If the one or more wheels 42, 66 has reengaged the ground, the method 200 moves on to block 214 where the one or more clutches that were opened at block 206 are closed to reconnect the one or more wheels 42, 66 to the remainder of the powertrain and to the powerplants. The one or more wheels 42, 66 reengaging the ground may be determined based on the expected flight time determined at block 208. Alternatively, the wheel speeds may be controlled to a value that is offset from the ground speed at block 210 and the clutches may be controlled to slip to prevent transferring the excessive load to the drivetrain/powertrain during reengagement at block 214. Also, during disengagement between blocks 206 and 214, the controller 50 may (i) limit driver torque demands from the accelerator pedal 52 and brake pedal 58, (ii) relieve powertrain torque so the clutch does not trap and to minimize wheel speed adjustments for re-engagement, and (iii) control wheel speed via a combination of clutch torque dropout/reapply and powertrain torque generation in order to keep the clutch cool.

Alternatively, reengaging the ground may be determined based on the displacement of the suspension of components (e.g., dampers, shocks, struts, spring, etc.) from resting positions. Suspension damper loads can be calculated through inputs such as wheel position (e.g., jounce or droop), wheel velocity, damper force-velocity of the suspension of components, and force-displacement characteristics of the suspension of components. The output displacement values may be used to further refine vehicle response during and after the landing of the vehicle 10 (e.g., the one or more wheels 42, 66 reengaging the ground). For example, the closing the one or more clutches at block 214 may not occur until the suspension components have stabilized after landing (e.g., the suspension components have returned to resting positions or have remained within a threshold of the resting positions for a predetermined period of time). Stabilization of the suspension components may be determined by monitoring, measuring, and/or calculating (i) wheel travel via ride height sensors 82 and (ii) linear or rotational acceleration measurements via the IMU 80.

It should be understood that the flowchart in FIG. 2 is for illustrative purposes only and that the method 200 should not be construed as limited to the flowchart in FIG. 2. Some of the steps of the method 200 may be rearranged while others may be omitted entirely.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
a first axle having a first set of wheels;
a second axle having a second set of wheels;
a powerplant configured to generate and deliver power to the first and second axles to propel the vehicle;
a transmission (i) configured to deliver power from the powerplant to the first axle and (ii) having a first clutch configured to connect and disconnect the first axle to and from the powerplant;
a transfer case (i) configured to deliver power from the powerplant to the second axle and (ii) having a second clutch configured to connect and disconnect the second axle to and from the powerplant; and
a controller programmed to,
in response to detecting one or more of the first set of wheels disengaging the ground during a vehicle jump, open the first clutch to disconnect the first axle from the powerplant,
in response to detecting one or more of the second set of wheels disengaging the ground during the vehicle jump, open the second clutch to disconnect the second axle from the powerplant,
in response to detecting the one or more of the first set of wheels reengaging the ground during a vehicle landing after the vehicle jump, close the first clutch to reconnect the first axle to the powerplant, and
in response to detecting the one or more of the second set of wheels reengaging the ground during a vehicle landing after the vehicle jump, close the second clutch to reconnect the second axle to the powerplant.

2. The vehicle of claim 1 further comprising an inertial measurement sensor configured to detect an acceleration in a non-horizontal direction and communicate the acceleration in the non-horizontal direction to the controller, and wherein detecting the one or more of the first set of wheels or the one or more of the second set of wheels disengaging the ground is based on the acceleration in the non-horizontal direction exceeding a threshold.

3. The vehicle of claim 2 further comprising a height sensor configured to detect a vehicle ride height, and wherein detecting the one or more of the first set of wheels or the one or more of the second set of wheels disengaging the ground is further based on the vehicle ride height exceeding a second threshold.

4. The vehicle of claim 1, wherein detecting the one or more of the first or second set of wheels disengaging the ground during the vehicle jump is based on a droop of the one or more of the first or second set of wheels exceeding a threshold for a predetermined period of time.

5. The vehicle of claim 1 further comprising an accelerator pedal, and wherein detecting the one or more of the first or second set of wheels disengaging the ground during the vehicle jump is based on a positive acceleration of the one or more of the first or second set of wheels exceeding a threshold while the accelerator pedal is depressed.

6. The vehicle of claim 5 further comprising a brake pedal, and wherein detecting the one or more of the first or second set of wheels disengaging the ground during the vehicle jump is based on a negative acceleration of the one or more of the first or second set of wheels exceeding a second threshold while the brake pedal is depressed.

7. The vehicle of claim 1, wherein detecting the one or more of the first or second set of wheels disengaging the ground during the vehicle jump is based on a mapped relationship between a vehicle speed, a non-horizontal acceleration of the vehicle, and a vehicle ride height.

8. The vehicle of claim 1, wherein the controller is further configured to adjust speeds of the one or more of the first or second set of wheels during a flight time of the vehicle during the vehicle jump such that the speeds of the one or more of the first or second set of wheels correspond to a ground speed at a time of the vehicle landing, and wherein the flight time of the vehicle corresponds to the time period between an initiation of the vehicle jump and the vehicle landing.

9. The vehicle of claim 8, wherein the flight time is based on a mapped relationship between a vehicle speed, a non-horizontal acceleration of the vehicle, and a vehicle ride height.

10. The vehicle of claim 8, wherein the ground speed at the time of the vehicle landing is based on a vehicle speed at an initiation of the vehicle jump minus an expected decrease in vehicle speed during the flight time.

11. A vehicle comprising:
at least one drive wheel;
a powerplant configured to generate and deliver power to the at least one drive wheel;
a clutch disposed between the at least one drive wheel and the powerplant; and
a controller programmed to, in response to detecting the at least one drive wheel disengaging the ground during a vehicle jump, open the clutch to disconnect the at least one drive wheel from the powerplant.

12. The vehicle of claim 11, wherein detecting the at least one drive wheel disengaging the ground is based on an acceleration in a vertical direction exceeding a threshold.

13. The vehicle of claim 12, wherein detecting the at least one drive wheel disengaging the ground is further based on a vehicle ride height exceeding a second threshold.

14. The vehicle of claim 11, wherein detecting the at least one drive wheel disengaging the ground during the vehicle jump is based on an acceleration of the at least one drive wheel, to increase a speed of the at least one drive wheel, exceeding a threshold.

15. The vehicle of claim 11, wherein detecting the at least one drive wheel disengaging the ground during the vehicle jump is based on a braking acceleration of the at least one drive wheel, to decrease a speed of the at least one drive wheel, exceeding a threshold.

16. The vehicle of claim 11, wherein detecting the at least one drive wheel disengaging the ground during the vehicle jump is based on a mapped relationship between a vehicle speed, a vertical acceleration of the vehicle, and a vehicle ride height.

17. The vehicle of claim 11, wherein the controller is further programmed to, in response to detecting at least one drive wheel reengaging the ground during a vehicle landing after the vehicle jump, close the clutch to reconnect the at least one drive wheel to the powerplant.

18. The vehicle of claim 17, wherein the controller is further configured to adjust a speed of at least one drive wheel during a flight time of the vehicle during the vehicle jump such that the speed of the at least one drive wheel corresponds to a ground speed at a time of the vehicle landing, and wherein the flight time of the vehicle corresponds to the time period between an initiation of the vehicle jump and the vehicle landing.

19. The vehicle of claim 18, wherein the flight time is based on a mapped relationship between a vehicle speed, a non-horizontal acceleration of the vehicle, and a vehicle ride height.

20. A vehicle comprising:
   an axle having a drive wheel;
   a powerplant configured to generate and deliver power to the axle to propel the vehicle;
   a clutch disposed between the axle and the powerplant; and
   a controller programmed to,
      in response to detecting the drive wheel disengaging the ground during a vehicle jump, open the clutch to disconnect the axle from the powerplant, and
      adjust a speed of the drive wheel over a flight time of the vehicle during the vehicle jump such that the speed of the drive wheel corresponds to a ground speed at a time of the vehicle landing.

\* \* \* \* \*